No. 665,343. Patented Jan. 1, 1901.
G. PFEIL.
STRAINER FOR MILK PAILS OR SIMILAR VESSELS.
(Application filed Feb. 7, 1900.)
(No Model.)
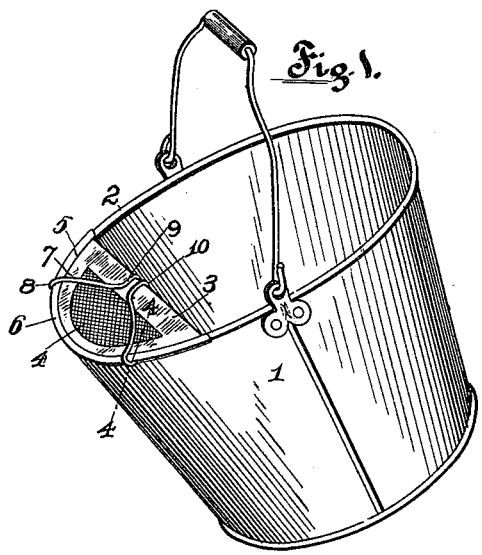
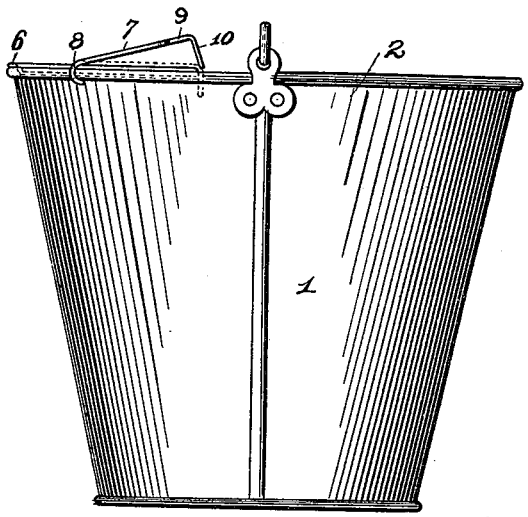
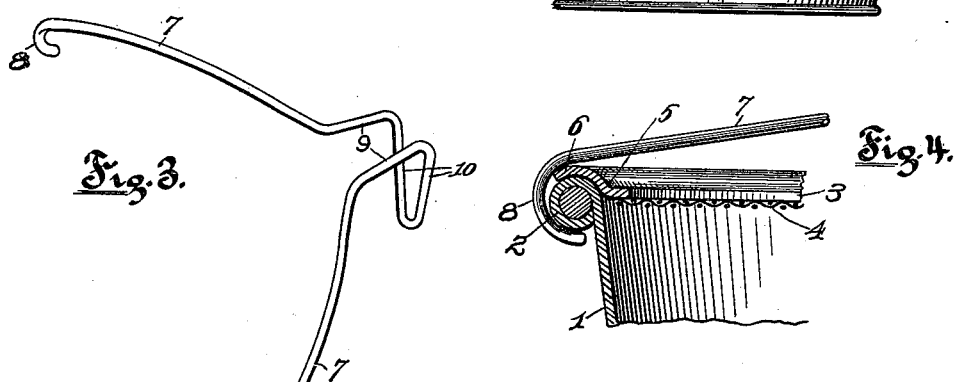
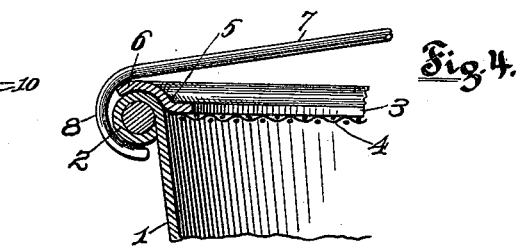
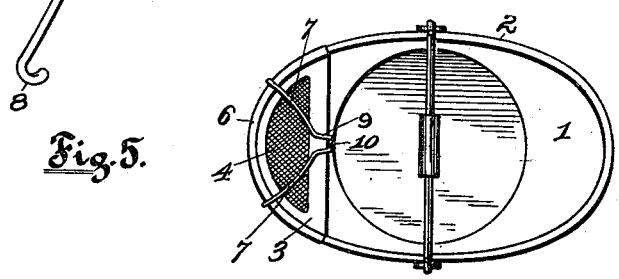
Witnesses
G. L. Belfry
A. S. Grady
Inventor
Grace Pfeil
By Emil Stareck Atty.

UNITED STATES PATENT OFFICE.

GRACE PFEIL, OF CHICAGO, ILLINOIS.

STRAINER FOR MILK-PAILS OR SIMILAR VESSELS.

SPECIFICATION forming part of Letters Patent No. 665,343, dated January 1, 1901.

Application filed February 7, 1900. Serial No. 4,347. (No model.)

*To all whom it may concern:*

Be it known that I, GRACE PFEIL, a citizen of the United States, residing at Chicago, in the county of Cook and State of Illinois, have invented certain new and useful Improvements in Strainers for Milk-Pails or Similar Vessels, of which the following is a full, clear, and exact description, reference being had to the accompanying drawings, forming a part hereof.

My invention has relation to improvements in milk-strainers; and it consists in the novel arrangement and combination of parts more fully set forth in the specification and pointed out in the claims.

In the drawings, Figure 1 is a perspective view of a pail, showing my strainer attached. Fig. 2 is a side elevation of the pail and locking device, the latter being in its elevated position. Fig. 3 is a perspective view of the locking device detached. Fig. 4 is a sectional detail on line 4 4 of Fig. 1, the arm of the locking device being slightly raised; and Fig. 5 is a top plan of the pail and strainer attached thereto.

The object of my invention is to construct a strainer attachment which can be secured to or removed from a pail at a moment's notice, one which is cheap, durable, and convenient, and one possessing further and other advantages more apparent from a detailed description of the invention, which is as follows:

Referring to the drawings, 1 represents a milk-pail elliptical on top, but having a circular bottom, the object being to give the sides of the pail a somewhat flattened outline, whereby in milking it can be better held between the knees of the operator. The upper edge of the pail is provided with an exterior bead 2, leaving the inside smooth and at all times easy to be cleaned. The strainer-plate comprises a body portion 3, having a perforate or wire-gauze section 4, through which the straining is effected. The plate 3 has a rear straight edge and a forward upwardly-turned wall 5, conforming to the curvature of the beaded edge of the pail, the wall 5 having deflected therefrom an outward flange 6, resting on top of the beaded edge.

The locking attachment comprises a device made of a single piece of wire and is composed of two diverging outwardly-convex arms 7 7, the free ends of which terminate in downwardly-curved hooks or claws 8, adapted to engage the under surface of the bead 2. The arms 7 7 at their meeting ends are provided with outwardly-extending slightly-converging straight extensions 9 9, which are then deflected downward in a plane substantially at right angles to the plane of the parts 9 9 and in the same direction as the hooks 8 8, assuming the form of a V-shaped locking-arm 10.

In applying the locking device the latter is held inclined, as shown in full lines in Fig. 2, the hooks 8 having previously been passed under the bead 2. In this position the hooks serve as pivots about which the locking attachment can swing. In swinging the attachment downward toward the strainer-plate the arm 10 describes an arc of a circle, and as the arms 7 7 are insufficient in length to allow the arm to swing freely downward without frictionally engaging the straight or rear edge of the plate 3 the arm 10 will engage the said edge, drawing the plate firmly against the curved wall of the pail, and thus locking the strainer securely in place. (See dotted position of parts in Fig. 2.) To remove the strainer, the operator simply swings the attachment upward, when the strainer-plate can be taken off. In passing the arm 10 over the straight edge of the plate 3 during the locking operation the resilience of the arms 7 7 permits the latter to yield sufficiently to insure the frictional engagement between the parts, as already above specified.

It is apparent that the device is susceptible of minor changes without departing from the spirit of my invention. I do not, of course, limit the application thereof to milk-pails, but it may be used in connection with vessels generally.

Having described my invention, what I claim is—

1. A locking attachment for strainers, comprising two flexible diverging arms, hooks at the free ends of said arms, and a locking-arm at the opposite meeting end of the diverging arms deflected from the plane of the diverging arms, substantially as set forth.

2. A locking attachment for milk-strainers, composed of a single piece of wire, and having two outwardly-diverging arms, hooks at the free ends of the arms, and a locking-arm at the opposite end, deflected from the plane of the diverging arms, substantially as set forth.

3. A locking attachment for milk-strainers composed of a single piece of wire; and having two diverging, outwardly-convex arms, hooks at the free ends of the arms, outwardly-extending converging extensions at the converging ends of the arms, a locking-arm deflected at substantially right angles to the plane of the extensions, and in the same direction as the hooks, the parts operating substantially as and for the purpose set forth.

In testimony whereof I affix my signature in presence of two witnesses.

GRACE PFEIL.

Witnesses:
EMIL STAREK,
G. L. BELFRY.